United States Patent

Reimers

[15] 3,675,117

[45] July 4, 1972

[54] ASYNCHRONOUS GENERATOR DEVICE

[72] Inventor: Eberhart Reimers, 7700 Random Run Lane #201, Falls Church, Va. 22042

[22] Filed: April 26, 1971

[21] Appl. No.: 137,368

Related U.S. Application Data

[63] Continuation-in-part of Ser. No. 55,205, July 15, 1970.

[52] U.S. Cl. .............................. 322/31, 310/125, 310/211, 322/32, 322/47
[51] Int. Cl. ........................................................ H02p 9/46
[58] Field of Search ..................... 322/47, 29, 31, 32, 25, 28, 322/59; 310/125, 211

[56] References Cited

UNITED STATES PATENTS

| | | | |
|---|---|---|---|
| 2,758,272 | 8/1956 | Franklin | 322/47 |
| 3,043,115 | 7/1962 | Harter | 322/47 X |
| 3,054,941 | 9/1962 | Williams | 322/47 |
| 3,366,869 | 1/1968 | Young | 322/47 X |

Primary Examiner—Lewis H. Myers
Assistant Examiner—H. Huberfeld
Attorney—Harry M. Saragovitz, Edward J. Kelly, Herbert Berl and Glenn S. Ovrevik

[57] ABSTRACT

The drive means of this invention comprises a squirrel cage induction motor adapted to operate as an asynchronous alternator without the use of an auxiliary synchronous machine. This relatively light weight drive means is especially appropriate for vehicle propulsion.

8 Claims, 5 Drawing Figures

INVENTOR
*Eberhart Reimers*

BY
Harry M. Saragovitz
Edward J. Kelly
Herbert Berl
Glenn S. Ovrevik

INVENTOR
Eberhart Reimers

BY
Harry M. Saragovitz
Edward J. Kelly
Herbert Berl
Glenn S. Ovrevik

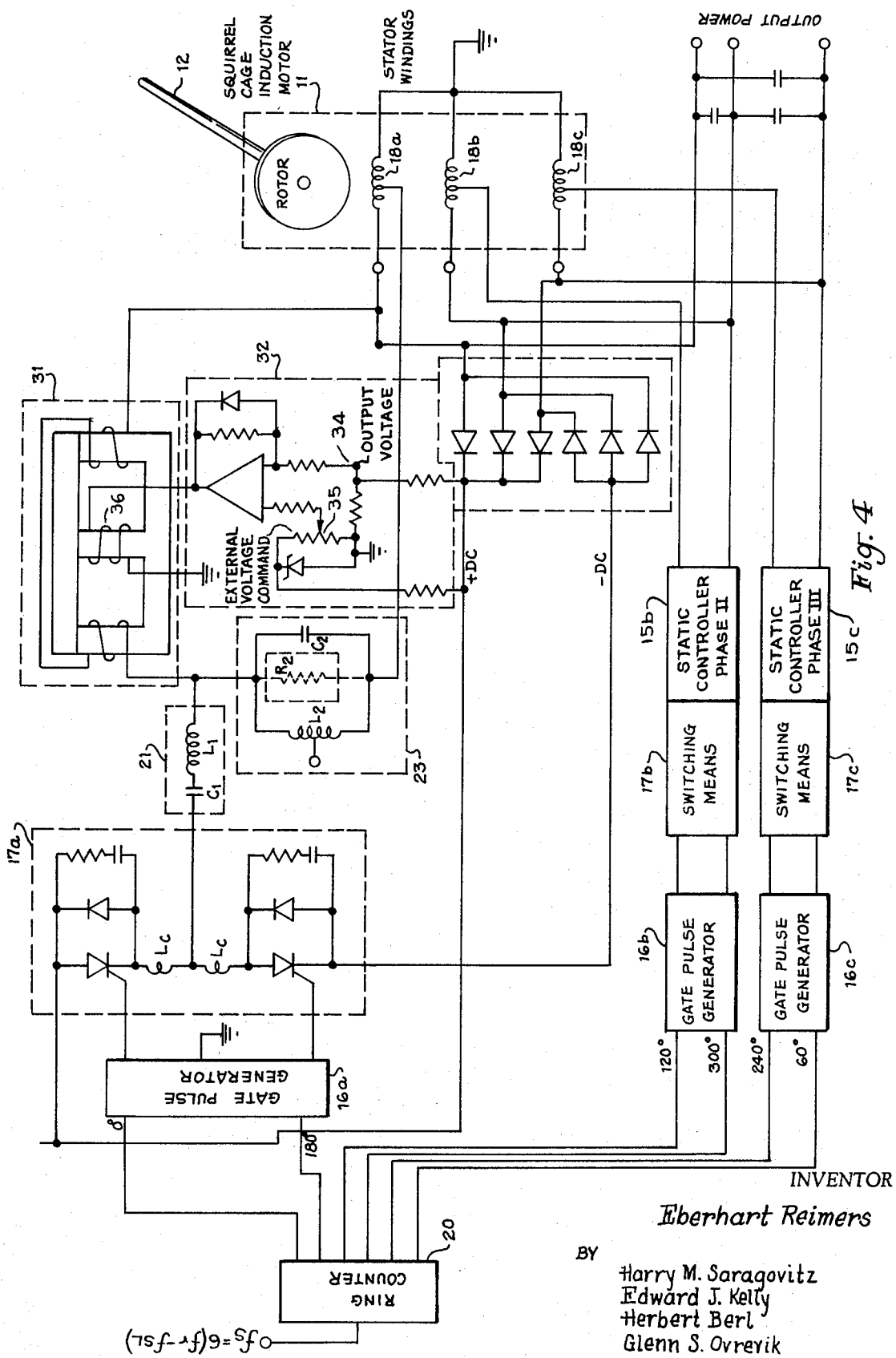

INVENTOR
Eberhart Reimers
BY
Harry M. Saragovitz
Edward J. Kelly
Herbert Berl
Glenn S. Ovrevik

ASYNCHRONOUS GENERATOR DEVICE

RELATED APPLICATION

This application is a continuation-in-part of the inventor's previously filed application, Ser. No. 55205, filed July 15, 1970, entitled "Low Cost Asynchronous Alternator Power Supply Suitable for Propulsion Drive Applications and General Purpose Power Supplies."

GOVERNMENT USE

The invention described herein may be manufactured and used by or for the Government of the United States of America for governmental purposes without the payment to me of any royalties thereon.

BACKGROUND OF THE INVENTION

Considerable interest in electrical vehicle drive means has developed in recent years as the public has recognized the necessity of reducing the pollution generated by the internal combustion engine. One of the more interesting electrical drive means previously considered by others involves a synchronous alternator which is directly driven by a constant speed turbine powered device. The synchronous alternator generally has not proven successful as a mechanical drive replacement, however, due to its low HP/weight performance and its low HP/dollar cost effectiveness. For example, in a typical synchronous alternator system both current mode control circuitry and voltage mode control circuitry are required to supply DC power to the generator excitation field to eliminate the effect of the alternator field time constant. The current mode control circuitry generally requires a bank of rectifiers and control circuitry therefore which substantially increases the weight and bulk of the system.

Heretofore, asynchronous as well as synchronous alternators have been considered as drive means and it is known that induction motors have been utilized as asynchronous alternators by use of an auxiliary synchronous machine. A complete description of this type of asynchronous alternator operation may be found in recognized textbooks such as *Alternating Current Machines*, pages 314–320, 2nd edition, John Wiley & Sons, Inc., New York, New York. In essence, in this application of induction motors, the induction motor continues to draw excitation power and forces power back into the supply or utility line when generating. The greater the negative slip frequency, the more power is returned. However, due to the machine's inability to furnish leading current amplitudes to sustain its own magnetization and to supply reactive power to its load, prior art asynchronous alternators have required the parallel operation of an auxiliary synchronous generator which provides "wattless current" to generate the prescribed flux. In a typical prior art application, the power demand from the mechanical drive is satisfied by a specified rotor current and a corresponding stator current, which in turn circulates through the lead sustaining the desired terminal voltage. Thus, in prior asynchronous alternators, the power factor and efficiency are machine constants that are essentially dependent upon the operating mode of the asynchronous machine and the losses within the auxiliary synchronous machine as a function of load and flux. The magnetization current is typically 40 percent of the load current, requiring a power rating for the auxiliary synchronous machine approximately 60 percent of that of the induction motor when the system furnishes power to the load at unity power factor. Obviously, the combined weight of the prior art system is substantial. To illustrate, the combined weight for a typical 50 HP generator operating at 400 Hz and 12000 RPM:, providing a 37.5 k2 output, would be in the neighborhood of 158 lbs. Despite recognized operational advantages, the weight disadvantage of this prior art motor generator-auxiliary synchronous machine system has precluded its use in mobile applications. It will be appreciated that a relatively compact, light weight and low cost asynchronous alternator, suitable for operation in conjunction with a constant speed turbine power device or the like, is needed and would be welcomed as a substantial advancement of the electric powered vehicle art.

SUMMARY OF THE INVENTION

The invention described herein embodies a conventional constant speed mechanical drive means, such as a turbine, to drive the rotor of a squirrel cage induction motor and a tachometer means which provides actual rotor speed information. The stator windings of the squirrel cage induction motor are energized by impressing a controlled variable voltage thereacross in selected frequency and phase relation with respect to the rotor speed (rotation rate) such that amplitude of the controlled voltage regulates the flux level of the induction motor while its slip frequency regeneratively increases the output current capability of the induction motor. Thus, the squirrel cage induction motor is operative as an asynchronous alternator without the use of an auxiliary synchronous machine.

In this invention, the squirrel cage induction motor is operated at relatively high speed with a controlled slip frequency and flux in accordance with power output demand. By operating with a negative slip frequency $f_s$, i.e. a stator control frequency less than the rotor relation rate, the squirrel cage induction motor generates power.

It has been verified that the excitation voltage can be impressed across the p-phase stator winding and that the excitation voltage amplitude regulates the flux level of the machine, while the alternator's output current capability increases with the slip frequency.

Since the squirrel cage induction motor furnishes only real power when driven as an alternator, the reactive power requirement must be satisfied otherwise to provide for worst case magnetization and load power factors. In preferred embodiments of the present invention, the reactive volt-ampere capacity thereof is regulated by a static controller. The disclosed asynchronous alternator is not only more compact and lightweight but it affords an improved efficiency of power generation and a higher power density as compared with conventional asynchronous alternators.

These features and other significant objects of the invention will become apparent from a clear understanding of the invention for which reference is had to the description of several embodiments of the invention and to the drawings herein:

FIG. 4 is a more detailed schematic showing of one typical phase inverter, operative in conjunction with a static controller having a variable inductive reactance of the magnetic amplifier variety.

To provide a more complete understanding of the invention, the following abbreviations are used throughout the description:

$n$ = Countdown rate
$N$ = Shaft speed in RPM
$N_o$ = Maximum rated shaft speed
$f_r$ = Rotor frequency, Hz
$f_s$ = Stator frequency, Hz
$f_{SL}$ = Slip frequency, Hz

DESCRIPTION OF THE PREFERRED EMBODIMENTS

Figures 1, 3:
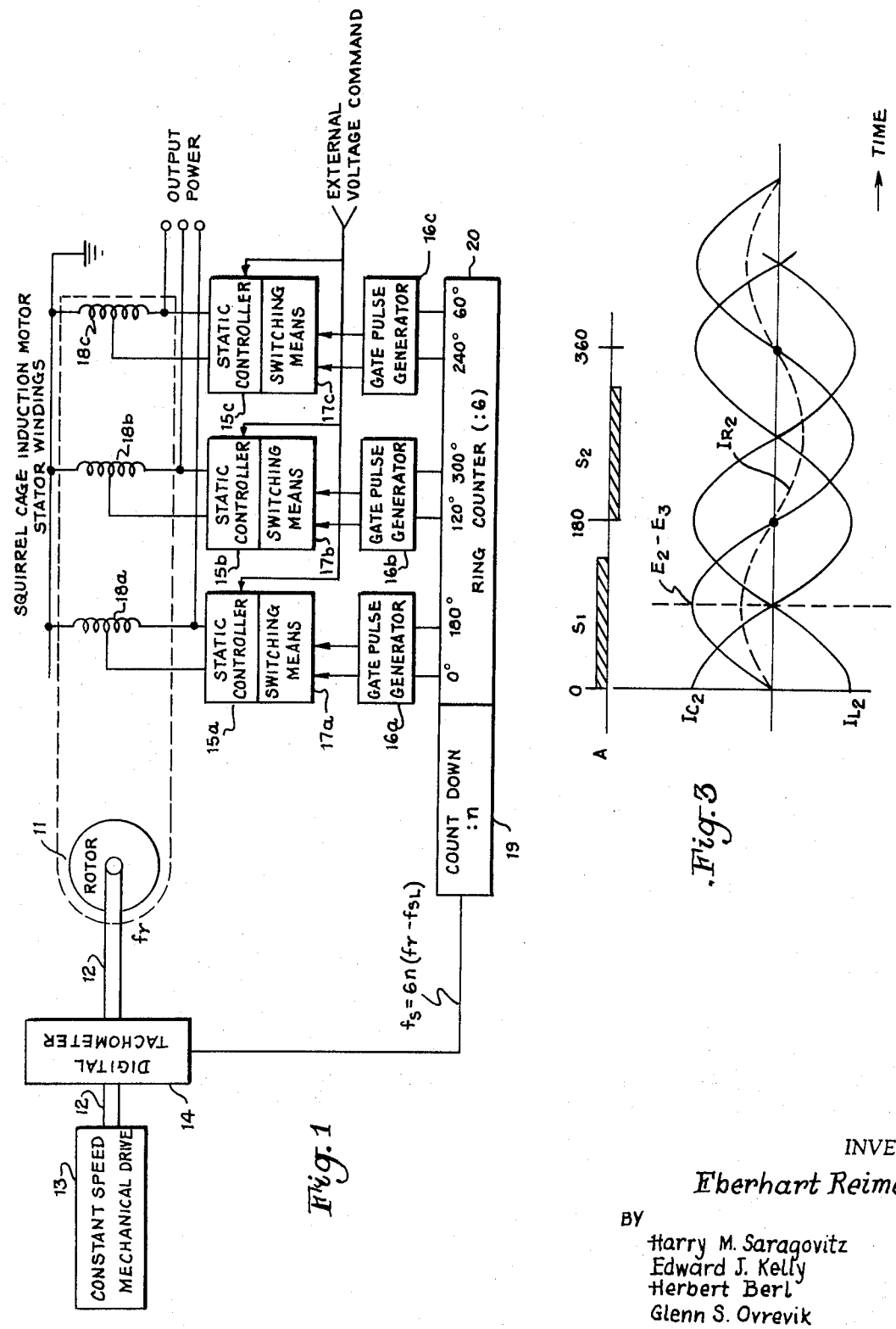
FIG. 1 shows a basic block diagram of a first embodiment of the improved asynchronous alternator of this invention.
FIG. 3 is a graphic presentation of critical voltage-current phase relations in that portion of the static controller associated with one stator winding.

Referring now to the block diagram showing of FIG. 1, the rotor of squirrel cage induction motor 11 is mechanically connected by conventional drive shaft means 12, or the like, to a rotary power source 13 which provides a relatively constant speed $N = N_o$ output.

A digital tachometer 14, which is associated with the shaft 12 by mechanical, optical, electrical means, or the like, is adapted to provide rate of rotation information for the generation of an appropriate stator control frequency. In a typical case, the digital tachometer may consist of a slotted disc and an optical pickup or a tooth gear and a magnetic pickup. In such instances, each rotating slot or tooth generates an electrical output pulse and the output train is applied as an input signal to the countdown 19 and the p-phase counter 20 and thus to the static controllers 15a, 15b and 15c via binary or digital gate pulse generators 16a, 16b and 16c and respective phase inverters switching means 17a, 17b and 17c.

In accordance with the inventions, the tachometer output pulse rate per second is equivalent to the motor stator winding frequency $f_s$ times the countdown rate $n$ where $f_s = f_r - f_{SL}$.

As will be explained hereinafter, each static controller serves to energize its respective stator winding 18a, 18b or 18c of the induction motor 11 such that the stator control frequency is less than the rotation rate of the rotor.

Figure 2:
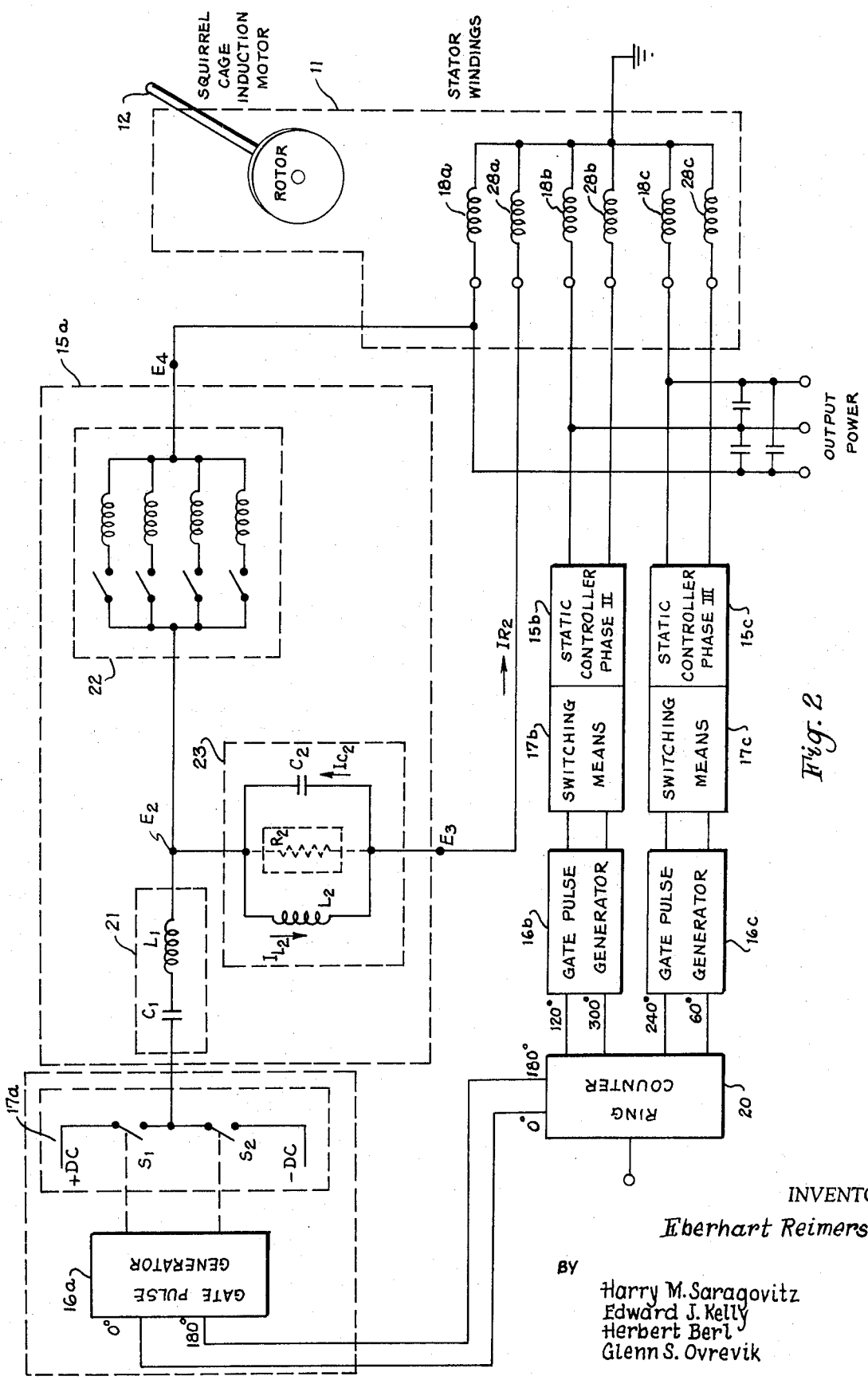
FIG. 2 is a more detailed schematic showing of the basic elements of the static controller as applied to one stator winding of a three phase induction motor.

In the embodiment of FIG. 1, and in the embodiments of FIG. 2 and FIG. 4 as well, the slip frequency is a constant in terms of constant rotor speed and typically chosen at 5 percent for high performance machines. In a practical example, the rotor speed might be chosen at 12 600 RPM for a four pole machine to obtain a stator frequency $f_s = 400$ Hz at a slip frequency $f_{SL} = 20$ Hz.

Dependent upon the output of the digital tachometer 14, a countdown means 19 and a ring counter 20 may be utilized as shown to provide the proper phase relation between the gate pulse generators 16a, 16b and 16c which serve to trigger the phase inverter switching means 17a, 17b and 17c in a determined phase relation.

Typically, the last stage of the ring counter 20 may consist of a p-phase ring counter, in terms of this embodiment three-phase, which gates a conventional thyristor trigger logic in the desired phase inverter switching means 17a, 17b and 17c sequence. The trigger logic of the gate pulse generator which triggers the phase inverter may include, for example, a conventional transformer coupled blocking oscillator.

For simplified illustration purposes, in FIG. 2, only one of the three static controllers, 15a, is shown in circuit detail. It will be appreciated, of course, that each of the static controllers 15a, 15b and 15c have substantially the same internal circuitry.

In FIG. 2, the series resonant tuned circuit 21, consisting of capacitance $C_1$ and inductance $L_1$, and the variable inductive reactance 22 in series connection electrically apply the AC output of the gate pulse generator, 16a through the phase inverter 17a, across the stator winding 18a. Also in accordance with the invention, a parallel tuned circuit 23 consisting of capacitance $C_2$, inductance $L_2$, with an equivalent internal resistive impedance $R_2$, is electrically connected in series with the series resonant tuned circuit 21 to electrically apply the AC output of the gate pulse generator 16a through the phase inverter 17a across auxiliary stator winding 28a.

As shown in the three phase embodiment of FIG. 2, the AC outputs of the phase inverters 17a, 17b and 17c are in the identical phase relations, 0° and 18°, 120° and 200°, and 240° and 60° respectively. It will be appreciated, of course, that the precise phase relation of the phase inverters is in accordance with the requisite phase relation of the stator windings in the multiphase induction motor as embodied here for its three phase configuration.

As will be described hereinafter, the variable inductive reactance may be automatically operative, as shown in the embodiment of FIG. 4, or it may take the form of a controlled inductance switching network, as shown in the embodiment of FIG. 2. In FIG. 2 the four inductance switching network can provide, for example, an inductive reactance change of 10:1, that is, utilizing inductive reactance values of 2.5, 2.5, 5 and 10 × unit reactance the current flow can be controlled from 0.1 maximum current to full current. Thus, it will be appreciated that the principal stator winding magnetization current can be controlled within reasonable limits to establish the magnetization essential to operation of the induction motor in its generator mode and furthermore, to satisfy the reactive power requirement of the load.

With no magnetization provided by current flow through the series tuned circuit 21, the variable inductive reactance 22 and the stator winding 18a, the machine, of course, would have a non-satisfied internal lagging power factor demand which renders the machine inefficient in its generating mode due to an equivalent excessive internal voltage drop.

To provide a useful machine excitation in this embodiment such that the machine produces a useful output current, the additional stator winding 28a is disposed in co-adjacent relation to the stator winding 18a and is concurrently energized by current flow through the series tuned circuit 21 and the parallel tuned circuit 23.

In accordance with the inventions, the tuned circuit elements of the parallel tuned circuit are selected to afford an adequate capacitive reactance which provides a leading magnetization current power supply for the stator winding 18a. Thus, the leading magnetization current, as provided by the parallel tuned circuit 22 compensates for the lagging power factor magnetization circuit in the stator winding 18 to provide the desired unity power factor at the output terminal of the stator winding.

Furthermore, in accordance with the invention, the combined tuned elements of the series and parallel circuit are selected to afford an adequate current flow within the auxiliary stator winding 28a, or its equivalent, which current-phase relationship is near unity power factor in respect to the output voltage $E_2$ of the series-shunt filter tuned circuit in order to sustain the excitation of the machine.

FIG. 3 is illustrative of the phase relation of current and voltage in the parallel tuned circuit with respect the operation of the switching means 17a in energizing the additional stator winding 28a.

FIG. 4, like FIG. 2, shows only one of the static controllers in circuit detail. In FIG. 4, a series tuned circuit 21 and a variable reactance 31 in series connection electrically apply the AC output of the gate pulse generator 16a through the phase inverter 17a across the entire stator winding 18a. In this embodiment, a portion of the stator winding 18a is utilized in lieu of an auxiliary stator winding, as shown in FIG. 2, and the parallel tuned circuit 23 in series with the series tuned circuit 21 electrically apply the AC output of the gate pulse generator 17a through the phase inverter 17a across the indicated portion of the stator winding 18a.

As described relative to FIG. 2, with only excitation provided by current flow through the series tuned circuit 21 and parallel tuned circuit 23 into one portion of the stator winding of 18a, the machine would have a lagging power factor. However, it will be appreciated that concurrent energization of the same stator winding 18a by means of the magnetizing current supply of the series tuned circuit 21 variety through the variable reactance 31, will yield a near unity power factor at the stator terminal lead and the machine will produce a useful output.

In the embodiment of FIG. 4, the variable reactance 22 shown in FIG. 2, has been replaced by a magnetic amplifier 31. The reactance of this amplifier is regulated by controlling the amplitude of the current flowing in the control winding 36 of the magnetic amplifier 31. A comparator 32, which may be of the differential amplifier variety, compares the magnitude of the voltage at output voltage terminal 34 with a voltage of reference magnitude which may be variable as shown at 35. It will be appreciated that the reactance of the magnetic amplifier decreases and thus the power transfer between the tuned filter and the machine increases proportionally with an increase in amplitude of the control current in the control winding 36. The magnitude of the control current amplitude in turn is a function of the output voltage amplitude 34 at the input of the amplifier 32. Typically, the actual alternator voltage amplitude is measured at the terminal of winding 18a, 18b and 18c and rectified by means of the dc-rectifier bridge 33. The proportional voltage signal is compared to an internal reference 35, identified in the drawing as external voltage command. The differential amplifier 32 measures the error voltage between external voltage command reference 35 and the rectified alternator output voltage from dc-rectifier bridge 33 at its inputs 35 and 34 respectively. If the error is negative, that is, the rectified alternator output voltage is low, the differential amplifier 32 provides an output voltage signal which, in turn, produces or increases current flow in winding 36 of the magnetic amplifier 31. As the rectified alternator output voltage increases, the error signal decreases and at zero output error or positive error voltage, the control current in winding 36 drops to zero and the reactance of the magnetic amplifier 31 increases to its maximum value.

It will be appreciated that the variable reactance, shown in FIG. 2 as a plurality of inductances with switching means for charging the reactance, and shown in FIG. 4 as a magnetic amplifier, may have other constructions as well. For example, a variable air gap inductive reactor with means for charging the air gap may be substituted, if desired.

Figure 5:
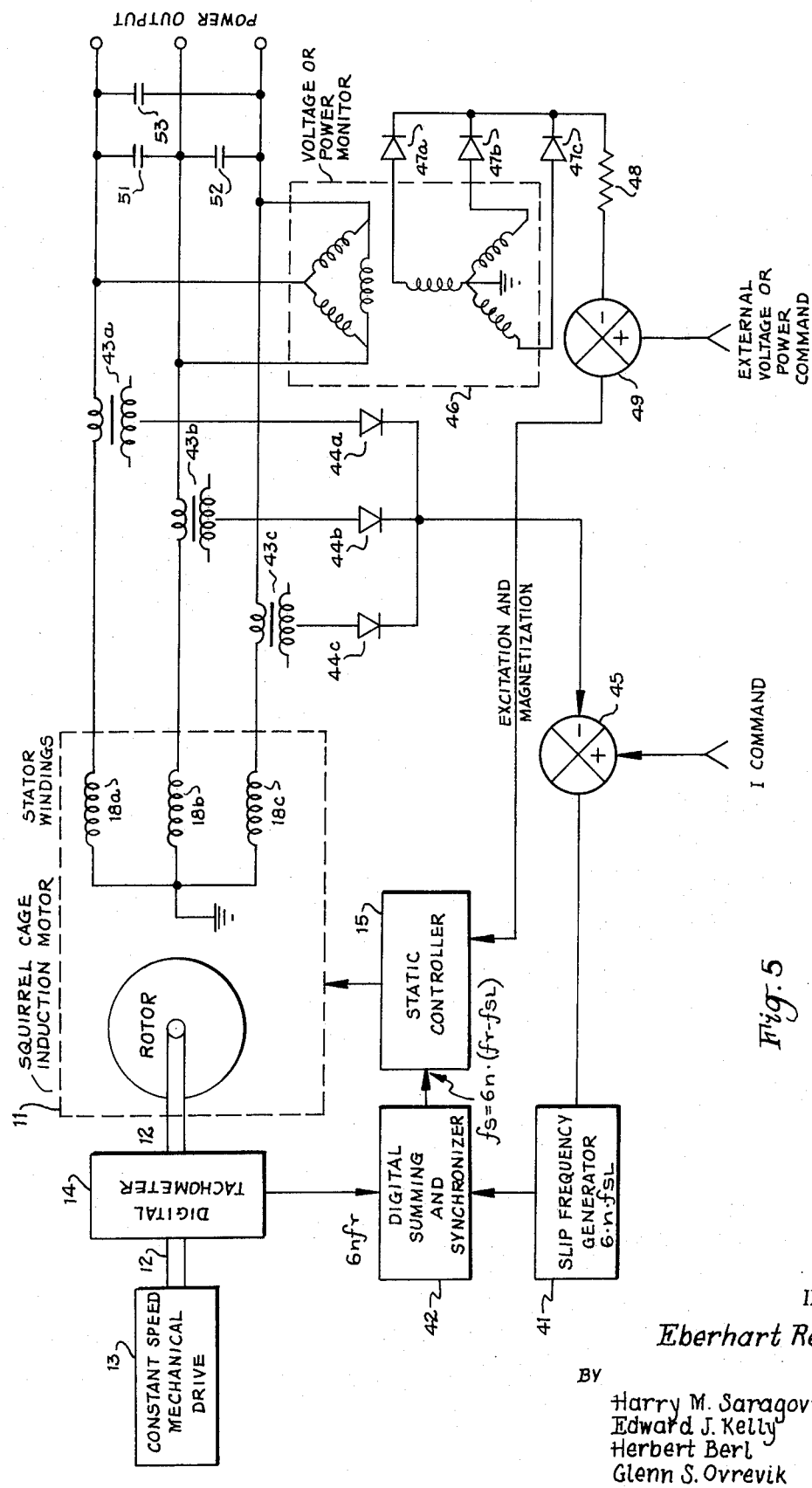
FIG. 5 shows a basic block diagram of a second embodiment of the improved asynchronous alternator of this invention.

Referring now to FIG. 5, it will be noted that the input signal to the static controller may be the difference or sum output of a digital summing and synchronizer means indicated at 42. In accordance with the embodiment of FIG. 5, the comparator means 42 receives one input from the tachometer 14 and a second input from slip frequency generator 41. If the output of slip frequency generator 41 is selected to be less than the rotor frequency $f_r$ output of the tachometer 14, the comparator means 42 may be a digital summing means and the frequency $f_{SL}$ output of the generator 41 may be subtracted from the rotor frequency $f_r$ so that the static controller 15 functions in accordance with the frequency $f_s = f_r - f_{SL}$.

In a typical case, the slip frequency generator 41 may be a voltage controlled relaxation oscillator of the type described in the General Electric Transistor Manual 6th Edition, pp. 191-201. Likewise, the digital summing means 42 may be a conventional solid state synchronizer of the type described in the Digital Logic Handbook, 1967 Edition, pp. 12-32, published by the Digital Equipment Company, Maynard, Mass.

In accordance with the embodiment of FIG. 5, the slip frequency generator 41 produces an output frequency which is variable in accordance with the magnitude of the current flow in the stator windings 18a, 18b and 18c. This current flow feedback information may be provided by means of current transformers 43a, 43b and 43c and a differential amplifier, as shown at 45.

Likewise, in accordance with the embodiment of FIGS. 1, 2 and 5, the variable reactance of the static controller 15 may be regulated as shown in FIG. 5 by means of a voltage or power monitor means comprising a transformer network, indicated at 46, a rectifier network 47a, 47b and 47c and differential amplifier 49. It will be appreciated that any conventional means may be used for measuring the magnitude of the current in the stator windings and for measuring the magnitude of the voltage in the stator windings. Likewise, a variety of electronic circuitry would be suitable for feedback of current or voltage information. For example, the current representative AC voltage may be converted to a DC voltage by a rectifier bank, as shown at 44a, 44b and 44c, and the voltage representative AC voltage also may be converted to a DC voltage, if desired, by means of a rectifier bank as shown at 47a, 47b, and 47c.

As in the other described embodiments, the rotor in the embodiment of FIG. 5 is driven by a relatively constant speed mechanical drive means 13 and output voltage magnitude information is fed back to the static controller 15 to control a variable reactance therein.

It will be appreciated that the use of "flash start" capacitors, as shown at 51, 52 and 43 in FIG. 5, is standard practice in the motor generator art and that these capacitors, typically 0.5 to 2.0 microfarad capacitance, merely serve to support the no load magnetization of the machine when starting.

The invention herein described may be modified in accordance with standard practice in the art without departure from the general purview of the disclosure. For example, the invention may be designed to function with a slip frequency $f_{SL}$ variable between determined reasonable limits (for example 2 to 10 percent of the rotor frequency $f_r$) without the feedback control shown in the embodiments of FIGS. 1, 4 and 5. Alternatively, a slip frequency which is a fixed frequency based upon average operating load and power conditions may be employed, if desired. Furthermore, the invention is not restricted to the use of a tachometer which provides an actual rotor frequency output signal, provided, of course, the output signal is representative of the rotor frequency in some useful manner.

What is claimed is:

1. An asynchronous generator comprising an induction motor of the multi-phase squirrel cage variety having a stator winding assembly for generating an internal magnetic field and a rotor winding assembly adapted to intercept said magnetic field when rotated;
   means for rotating said rotor winding assembly at a substantially constant frequency of rotation, $f_r$;
   means for energizing said stator windings in said assembly thereof including switching means for energizing each of said stator windings in selected sequential phase relation, each of said stator windings having respective means for electrically connecting said means for energizing thereto;
   said means for energizing having an output voltage of sufficient magnitude to overcome the normal lagging internal magnetizing component of said induction motor;
   first tuned circuit means including series resonant tank means and an inductive reactance means, being in series connection, and electrically connecting said means for energizing across selected stator windings in said assembly thereof;
   second tuned circuit means including said series resonant tank circuit and a parallel resonant tank circuit, being in series connection, and electrically connecting said means for energizing across at least a portion of selected stator windings in said assembly thereof;
   said respective stator winding being selected to produce a magnetic field of substantially like configuration and orientation with respect to that produced by energization by means of said first tuned circuit means;
   said switching means being a plurality of two stage phase inverter means operative at a frequency, $f_s$, to apply positive and negative voltage energization in alternate order, the time period of such positive and negative voltage energization being less than one-half cycle at said frequency $f_s$, said frequency $f_s$ being substantially five percent less than said frequency of rotation $f_r$;
   means responsive to variation in said frequency of rotation $f_r$, for varying the operating frequency $f_s$ of said switching means in accordance therewith;
   the resonant frequency of said resonant tank means in said first and second tuned circuit means being substantially, but less than, $f_s$;
   said first tuned circuit means having a selected reactance characteristic and said second tuned circuit means having a selected reactance characteristic such that said inductive motor operates in its generating mode near unity power factor.

2. An asynchronous generator as defined in claim 1 wherein said inductive reactance means is variable.

3. An asynchronous generator as defined in claim 2 wherein said inductive reactance means is a magnetic amplifier and the inductive reactance characteristic is variable in accordance with the flux level of said magnetic amplifier.

4. An asynchronous generator as defined in claim 1 wherein said first and second tuned circuit means concurrently energize the same stator winding with said second tuned circuit means adapted to energize a simple fractional portion thereof.

5. An asynchronous generator as defined in claim 1 wherein said assembly of stator windings is a plurality of pairs of stator windings with both windings in each pair disposed to produce a magnetic field of like configuration and orientation with respect the rotor winding assembly disposition;

said first tuned circuit means electrically connects said means for energizing across one stator winding in each pair thereof; and said second tuned circuit means electrically connects said means for energizing across the other stator winding in each pair thereof.

6. An asynchronous generator as defined in claim 1 wherein said means for varying the operating frequency $f_s$ of said switching means includes digital tachometer means adapted to produce an output signal at said frequency $f_s$.

7. An asynchronous generator as defined in claim 1 wherein said means for varying the operating frequency $f_s$ of said switching means includes digital tachometer means adapted to produce an output signal at said frequency $f_r$, a frequency generator, and comparator means responsive to the output of said digital tachometer and the output of said frequency generator and adapted to produce an output signal at said frequency $f_s$.

8. An asynchronous generator as defined in claim 7 wherein the output of said frequency generator is variable in accordance with deviations in magnitude of current flow in said stator windings.

* * * * *